US008509353B2

(12) United States Patent
Han et al.

(10) Patent No.: US 8,509,353 B2
(45) Date of Patent: Aug. 13, 2013

(54) DIGITAL RECEIVER

(75) Inventors: Seon-Ho Han, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 12/818,510

(22) Filed: Jun. 18, 2010

(65) Prior Publication Data

US 2010/0322361 A1 Dec. 23, 2010

(30) Foreign Application Priority Data

Jun. 23, 2009 (KR) .......................... 10-2009-0055799
Jan. 4, 2010 (KR) .......................... 10-2010-0000144

(51) Int. Cl.
*H03K 9/00* (2006.01)
(52) U.S. Cl.
USPC ........ 375/316; 375/345; 341/143; 455/200.1; 455/313
(58) Field of Classification Search
None
See application file for complete search history.

(56) References Cited

U.S. PATENT DOCUMENTS

| 5,323,457 | A   | * | 6/1994  | Ehara et al. ............. 379/392.01 |
| 6,218,972 | B1  |   | 4/2001  | Groshong |
| 6,476,754 | B2  |   | 11/2002 | Lowenborg et al. |
| 7,138,933 | B2  |   | 11/2006 | Nairn |
| 8,055,235 | B1  | * | 11/2011 | Gupta et al. ................. 455/296 |
| 2002/0169603 | A1 |  | 11/2002 | Sculley |
| 2005/0123072 | A1 | * | 6/2005  | Guimaraes ................. 375/319 |
| 2007/0129041 | A1 | * | 6/2007  | Yokoyama et al. .......... 455/280 |
| 2008/0032658 | A1 | * | 2/2008  | Tsai et al. ................. 455/313 |
| 2008/0139149 | A1 | * | 6/2008  | Mu et al. ................... 455/200.1 |
| 2009/0016424 | A1 | * | 1/2009  | Latham et al. .............. 375/238 |

FOREIGN PATENT DOCUMENTS

| CN | 1625064 A       | 6/2005 |
| DE | 102004059548 A1 | 6/2006 |
| WO | WO-2005/055449 A1 | 6/2005 |

OTHER PUBLICATIONS

Ronald F. Cormier Jr., et al., "Combining Subband Decomposition and Sigma Delta Modulation for Wideband A/D Conversion", ISCAS 1994, vol. 5, pp. 357-360, 1994.
Aria Eshraghi, et al., "A Comparative Analysis of Parallel Delta-Sigma ADC Architectures", IEEE Transactions on Circuits and Systems-I, vol. 51, No. 3, pp. 450-458, Mar. 2004.
Munkyo Seo, et al., "Comprehensive Digital Correction of Mismatch Errors for a 400-Msamples/s 80-dB SFDR Time-Interleaved Analog-to-Digital Converter", IEEE Trasactions on Microwave Theory and Techniques, vol. 53, No. 3, pp. 1072-1082, Mar. 2005.

(Continued)

Primary Examiner — Leon-Viet Nguyen
(74) Attorney, Agent, or Firm — Rabin & Berdo, P.C.

(57) ABSTRACT

In a digital receiver, a noise attenuation and signal magnitude mapping variable amplifying unit includes a filter and an amplifier, amplifies and band-bass filters an analog signal and attenuating white noise and an interference signal other than a band signal. An ADC performs subsampling on a carrier frequency of a desired signal and performs oversampling on the band of the desired signal by using a sampling frequency to convert the analog signal which has passed through the noise attenuation and signal magnitude mapping variable amplifying unit into a digital signal of a direct conversion frequency band or an intermediate frequency band. The ADC has a dynamic range for processing both the desired signal and an undesired signal adjacent to the desired signal. A digital signal processing unit converts a signal frequency of the digital signal or digital-filters an undesired signal within the digital signal and processes the digital signal by digitally adjusting a gain.

13 Claims, 7 Drawing Sheets

(56) References Cited

OTHER PUBLICATIONS

Fang Xu, "Perfect data reconstruction algorithm of time interleaved ADCs", IEEE International Test Conference, ITC'06, pp. 1-6, Oct. 2006.

Ronald F. Cormier Jr., et al., "A Fourth Order Bandpass Delta-Sigma Modulator with Digitally Programmable Passband Frequency", Analog Integrated Circuits and Signal Processing, 12, 217-229 (1997).

Jeongmin Park, et al., "A Wideband LNA and High-Q Bandpass Filter for Subsampling Direct Conversion Receivers", Journal of the Institute of Electronics Engineers of Korea (IEEK), vol. 45 (SD), Iss. 11, pp. 89-94, Nov. 2008.

Wu Lijuan, "Research on Radio Frequency Bandpass Sampling Software Radio Receiver", CNKI_Full-text database of Chinese outstanding master's thesis, p. 1 and 21, Oct. 17, 2005.

* cited by examiner

DIGITAL RECEIVER

CROSS-REFERENCE TO RELATED APPLICATIONS

This application claims the priorities of Korean Patent Application Nos. 10-2009-0055799 and 10-2010-0000144, filed in the Korean Intellectual Property Office on Jun. 23, 2009, and Jan. 4, 2010, disclosures of which are incorporated herein by reference.

BACKGROUND

1. Field of the Invention

The present invention relates to a digital receiver and, more particularly, to a technique that converts a received analog radio frequency (RF) signal into an intermediate frequency (IF) signal or a direct conversion (DC) signal by using a subsampling scheme and performs over-sampling on a desired signal band in order to convert even noise signals adjacent to a desired signal into a digital signal, thus digitally processing noise signals adjacent to the desired signal.

2. Description of the Related Art

FIG. 1 illustrates the structure of a conventional wireless communications receiver, in particular, a direct conversion (DC) receiver among those with various structures. In general, the conventional wireless communications receiver band-filters a signal received via an antenna, amplifies it, converts the amplified signal into a low-frequency band signal by using a mixer, filters a desired channel signal, and processes it through a variable gain amplifier (VGA) so that an analog-to-digital converter (ADC) can receive the signal having a certain magnitude. Namely, the conventional analog type receiver must filter out the undesired interference signal until such time as the analog signal is converted into the digital signal by using the ADC, which, thus, requires the mixer, the filter, and the VGA. These blocks, namely, the mixer, the filter, and the VGA, require a great deal of time to be designed and must be re-designed each time a process is upgraded. Thus, the use of the conventional analog designing scheme in developing a wireless transceiver such that is able to process multi-band signals and is applicable for various application fields is disadvantageous in terms of power consumption, chip area, and fast market adaptability.

Meanwhile, a wireless transceiver including digital design factors may complement the shortcomings of the analog designing scheme but it is difficult to implement such wireless transceiver including digital design factors.

In particular, in the case of a digital receiver that directly samples a high frequency band signal to perform digital signal processing, an ADC must operate at a considerably high frequency and have a high bit resolution, so it is not available to be implemented with the current technology. FIG. 2 is a conceptual view of an ideal software defined radio (SDR) receiver which filters a high frequency signal, amplifies it, and then immediately converts the amplified signal into a digital signal through an oversampling ADC. However, the receiver structure illustrated in FIG. 2 is merely a concept which cannot be implemented by current technology when a signal band is carried on a high carrier frequency. This is because the sampling frequency of the ADC should be at least double that of a carrier signal in order to satisfy a Nyquist theorem to restore a signal. For example, in order to process a signal of 2 GHz, an ADC which can operate at a sampling frequency of 4 GHz is needed, and in order to support a large input signal magnitude as well as operation speed, the ADC must have a large dynamic range. Also, if such an ADC was somehow to be implemented, the data output rate of the ADC would be so high that a digital processor at a rear stage of the ADC could not operate, and even if the digital processor managed to somehow operate, the issue of huge power consumption would remain to be handled.

Thus, in order to process a signal of a high frequency band, a conventional digital receiver must necessarily include a mixer for lowering the frequency band of the signal at a front stage of the ADC, a filter for canceling noise, and a VGA for adjusting the gain of the signal in order to obtain a signal of a certain magnitude. With these analog signal processing blocks, the ADC can only receive a signal as desired as possible and can also only receive a signal having as uniform a magnitude as possible, in order that the ADC can be easily designed.

FIG. 3 illustrates the concept and problem of sub sampling, showing a method for converting a signal having a high frequency into a signal having a low frequency through subsampling. Compared with a general Niquist sampling scheme, all signals located at positions corresponding to the multiplicity of sampling frequencies (fs) overlap with finally sampled signals by aliasing through subsampling. Thus, with this simple scheme, it is virtually impossible to obtain a desired signal-to-noise ratio at a final signal. Thus, in general, for both a Niquist sampling scheme and a sub sampling scheme, an anti-aliasing filter should be necessarily positioned at a front stage of the ADC.

FIG. 4 illustrates the structure of a digital receiver using a discrete signal processor, in which the digital receiver using a discrete signal processor may be an intermediary between the existing analog type receiver that can be implemented and an ideal digital receiver. In the digital receiver illustrated in FIG. 4, after a signal is filtered and amplified, it is processed by a discrete signal processor. Namely, the digital receiver illustrated in FIG. 4 has such a simple structure by significantly reducing the burden of the required filter and VGA. However, although the digital receiver has a modified structure for processing a signal in a discrete time domain, the signal remains an analog signal, which is thus still far too weak to obtain many advantages that can be otherwise obtained when a perfect digital receiver is implemented.

SUMMARY

An aspect of the present invention provides a digital receiver for designing that which has been designed in an analog area (i.e., analog domain) in the related art, in a digital area at its maximum level.

According to an aspect of the present invention, there is provided a digital receiver including: a noise attenuation and signal magnitude mapping variable amplifying unit including a filter and a variable amplifier, the noise attenuation and signal magnitude mapping variable amplifying unit for dividing a power of an analog signal into a plurality of sections, controlling a gain by the section to adjust a magnitude of the analog signal, and attenuating white noise and an interference signal in the analog signal; an analog-to-digital converter (ADC) for performing subsampling on a carrier frequency of a desired signal and performing oversampling on a band of the desired signal by using a sampling frequency to convert the analog signal which has passed through the noise attenuation and signal magnitude mapping variable amplifying unit into a digital signal of a direct conversion (DC) frequency band or an intermediate frequency band, the ADC having a dynamic range for processing the desired signal and for processing an undesired signal adjacent to the desired signal by using the oversampling when converting the analog signal into the digital signal; and a digital signal processing unit for converting a signal frequency of the digital signal or digital-filtering the undesired signal in the digital signal, and processing the digital signal by digitally adjusting a gain. The noise attenuation and signal magnitude mapping variable amplifying unit has impedance transforming function for converting a magnitude of a signal voltage of a signal power transmitted to the ADC.

In operating the sub sampling, the sub sampling frequency may be smaller than the carrier frequency, and may be set to allow the filter to attenuate aliasing noise and interference signal generated when the subsampling is performed to thus obtain a signal-to-noise ratio required for an output of the ADC.

The variable amplifier may convert a signal range of the analog signal into an input signal range of the ADC by controlling the gain by the section.

According to another aspect of the present invention, there is provided a digital receiver including: a noise attenuation and signal magnitude mapping variable amplifying unit including a filter and a variable amplifier, the noise attenuation and signal magnitude mapping variable amplifying unit for dividing a power of an analog signal into a plurality of sections, controlling a gain by the section to adjust a magnitude of the analog signal, and attenuating white noise and an interference signal in the analog signal; an analog-to-digital converter (ADC) for performing subsampling on a carrier frequency of a desired signal and performing oversampling on a band of the desired signal by using a sampling frequency to convert the analog signal which has passed through the noise attenuation and signal magnitude mapping variable amplifying unit into a digital signal of a direct conversion (DC) frequency band or an intermediate frequency band, the ADC having a dynamic range for processing the desired signal and for processing an undesired signal adjacent to the desired signal by using the oversampling when converting the analog signal into the digital signal; and a digital signal processing unit for converting a signal frequency of the digital signal or digital-filtering the undesired signal in the digital signal, and processing the digital signal by digitally adjusting a gain. The ADC includes an I-path subsampling ADC and a Q-path subsampling ADC, the I-path subsampling ADC converts the analog signal into an I signal by using the sampling frequency according to a first clock signal, and the Q-path subsampling ADC converts the analog signal into a Q signal by using the sampling frequency according to a second clock signal, the first clock signal and the second clock signal being mutually orthogonal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF EMBODIMENT

Figure 1:
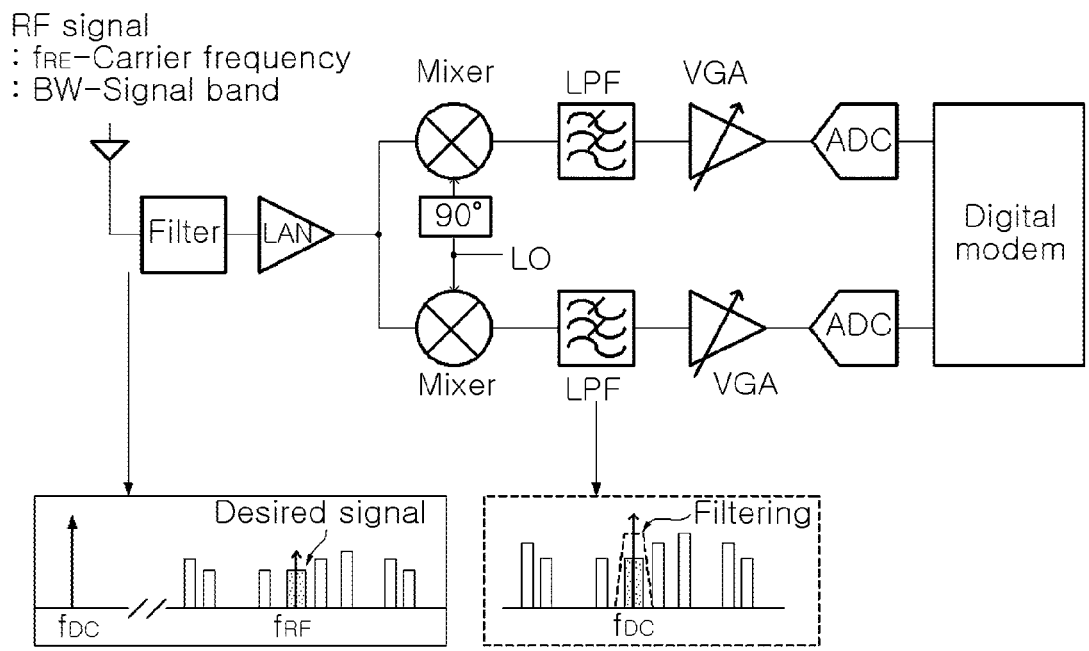
FIG. 1 illustrates the structure of a conventional wireless communication receiver.
Figure 2:
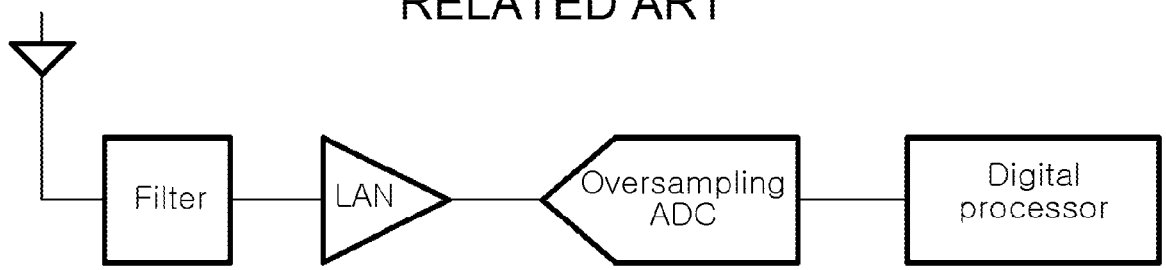
FIG. 2 is a conceptual view of an ideal software defined radio (SDR) receiver.
Figure 3:
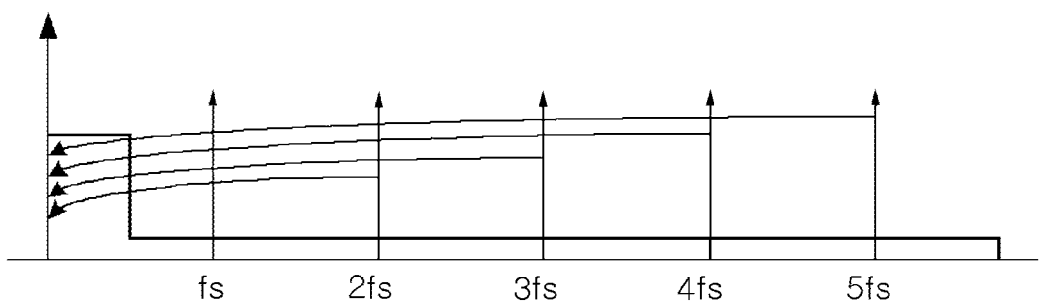
FIG. 3 illustrates the concept and problem of subsampling.
Figure 4:
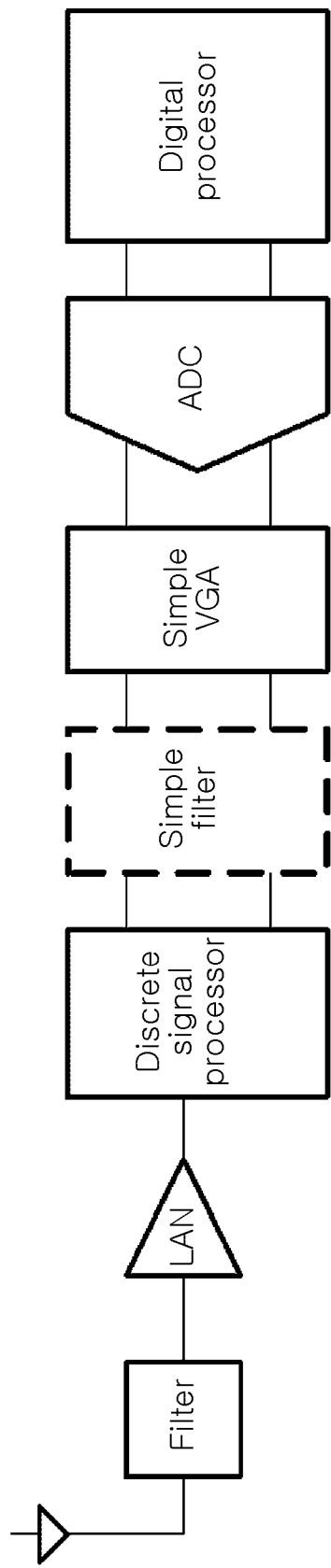
FIG. 4 is a schematic block diagram showing the structure of a digital receiver using a discrete signal processor.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert from the gist of the present invention, such explanation will be omitted but would be understood by those skilled in the art. The same elements or equivalents are referred to by the same reference numerals throughout the specification.

It will be understood that when an element is referred to as being "connected with" another element, it can be directly connected with the other element or may be indirectly connected with the other element with element(s) interposed therebetween. Unless explicitly described to the contrary, the word "comprise" and variations such as "comprises" or "comprising," will be understood to imply the inclusion of stated elements but not the exclusion of any other elements.

Figure 5:
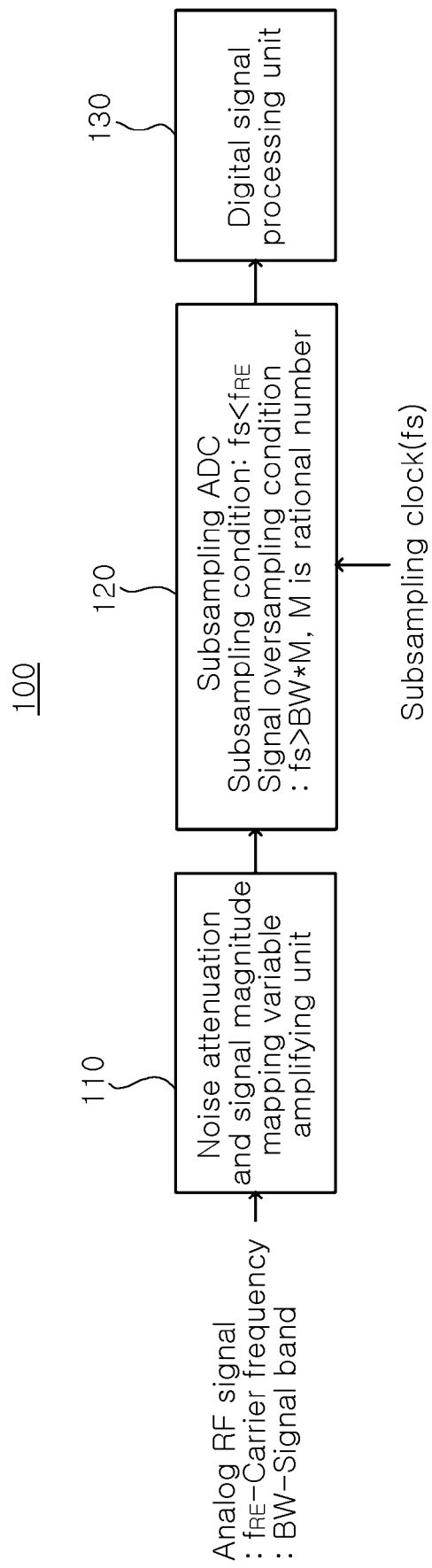
FIG. 5 is a schematic block diagram showing the structure of a digital receiver according to an embodiment of the present invention.

FIG. 5 is a schematic block diagram showing the structure of a digital receiver according to an embodiment of the present invention.

As shown in FIG. 5, a digital receiver 100 according to an embodiment of the present invention includes a noise attenuation and signal magnitude mapping variable amplifying unit 110, a subsampling analog-to-digital converter (ADC) 120, and a digital signal processing unit 130.

The noise attenuation and signal magnitude mapping variable amplifying unit 110 amplifies and band-filters a received analog radio frequency (RF) signal to reduce the power of noise such as an interference signal (i.e., an interferer), white noise, or the like, included in the received analog RF signal to below a certain level. Here, the noise attenuation and signal magnitude mapping variable amplifying unit 110 may be implemented as a filter, an amplifier having a noise canceling function, or a combination of one or more filters and amplifiers.

The subsampling ADC 120 converts the analog RF signal which has passed through the noise attenuation and signal magnitude mapping variable amplifying unit 110 into an IF or DC digital signal according to a subsampling scheme, and performs oversampling on a desired signal band having a certain bandwidth (BW) by using a higher sampling frequency than a general Nyquist sampling frequency (or sampling clock), thus converting even noise signals adjacent to the desired signal, as well as the desired signal, included in the analog RF signal into digital signals. In this manner, the subsampling ADC 120 has such a dynamic range for converting even the adjacent signals, as well as the desired signal, included in the received analog RF signal, into digital signals.

Here, the subsampling frequency (fs) may be set to be smaller than a carrier frequency (fRF) of the analog RF signal for subsampling. In addition, the sampling frequency may be set to be larger than a rational number multiple of the bandwidth (BW*M, M is rational number) of the desired signal for oversampling. Further, the subsampling frequency may be set to allow the filter to attenuate aliasing noise and interference signal generated when the subsampling is performed to thus obtain a signal-to-noise ratio required for an output of the subsampling ADC 120.

The characteristics of the subsampling ADC 120 differ depending on sampling schemes, and may perform sampling during a duty of a clock or at an edge of a clock. In one embodiment, the subsampling ADC 120 is performed at an edge of a clock.

The digital signal processing unit 130 converts a signal frequency of the digital signal or digital-filters the digital signal which has been converted by the subsampling ADC 120 to cancel noise signals adjacent to the desired signal and controls the gain according to the magnitude of the input signals to restore only the desired signals.

Figure 6:
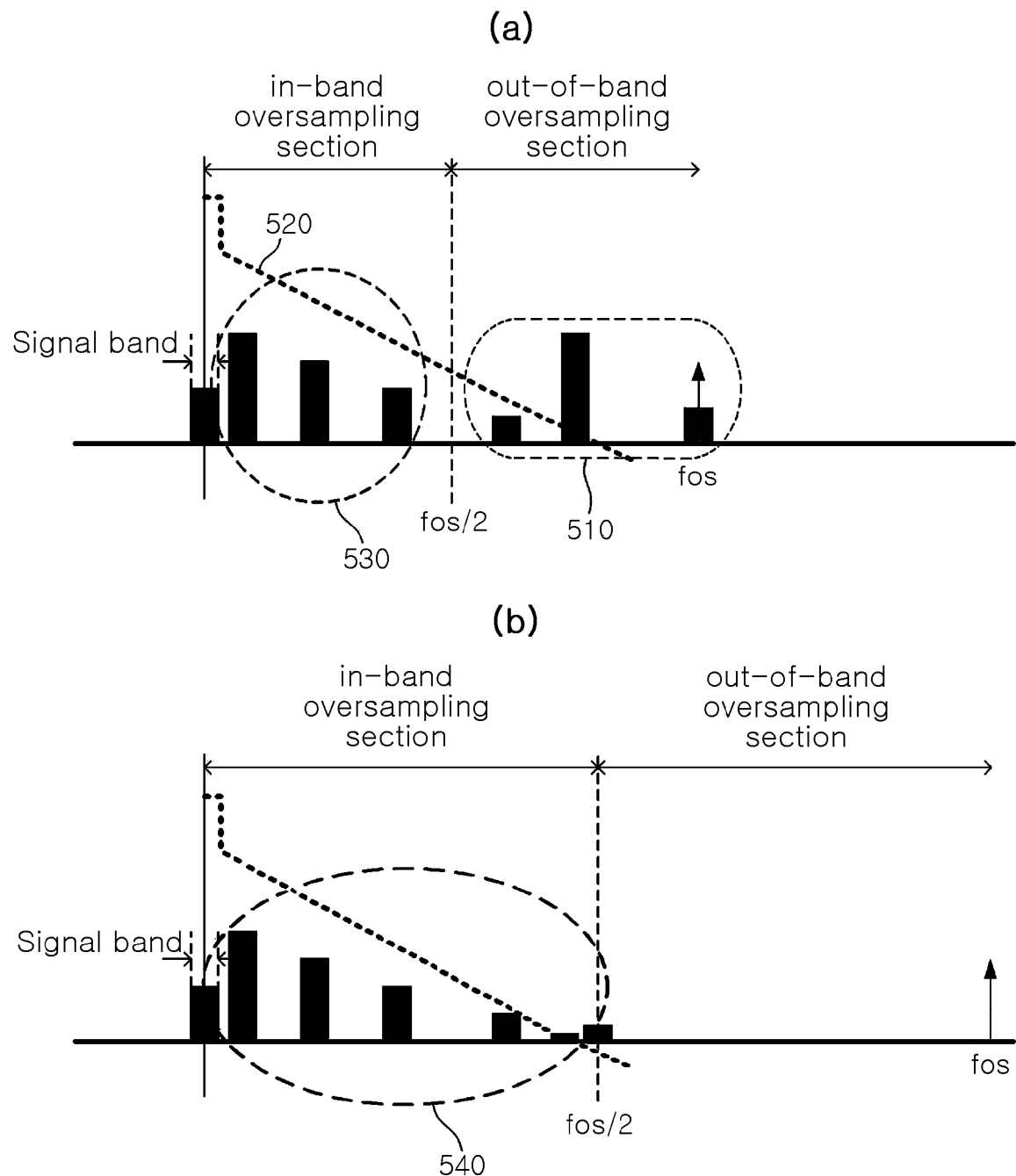
FIG. 6 illustrates a method of canceling noise by the digital receiver according to an embodiment of the present invention.

FIG. 6 illustrates a method of canceling noise by the digital receiver according to an embodiment of the present invention. As a signal that has been sampled through subsampling is a DC or IF signal, the signal may be differently illustrated. Also, in FIG. 6, the band of the analog RF signal is illustrated to be positioned at an integral multiple of a sampling frequency, and it may also be positioned as a rational number multiple.

With reference to FIG. 6(*a*), a plurality of interference signals 510 and 530 are present around or near a desired signal, and when subsampling is performed on the analog RF signal by using an oversampling frequency (fos), the interference signals 510 existing at an out-of-band oversampling section based on a folding frequency (fos/2) overlap with the interference signals 530 existing at an in-band oversampling section, causing an aliasing phenomenon.

In order to solve this problem, as shown in FIG. 6(*b*), the magnitude of the power of the interference signals 510, existing at the out-of-band oversampling section, is sufficiently attenuated so as not to cause a problem, even if the interference signals 510 overlap with the interference signals 530 existing at the in-band oversampling section, and then, oversampling is performed. In this case, the characteristics of the filter in use and the sampling frequency have a trade-off relationship so that if the filter fails to sufficiently reduce the interference signals, the sampling frequency is designed to be increased to widen the sampled band to sufficiently reduce overlapping interference signals. In this case, however, if the sampling frequency is excessively increased, the frequency for signal processing goes up and thereby causes power consumption, so the sampling frequency is determined in consideration of the characteristics of the filter. Accordingly, the subsampling ADC 120 of the digital receiver according to an embodiment of the present invention has a dynamic range allowing even noise signals which are adjacent to a desired signal to be converted into digital signals.

Figure 7:
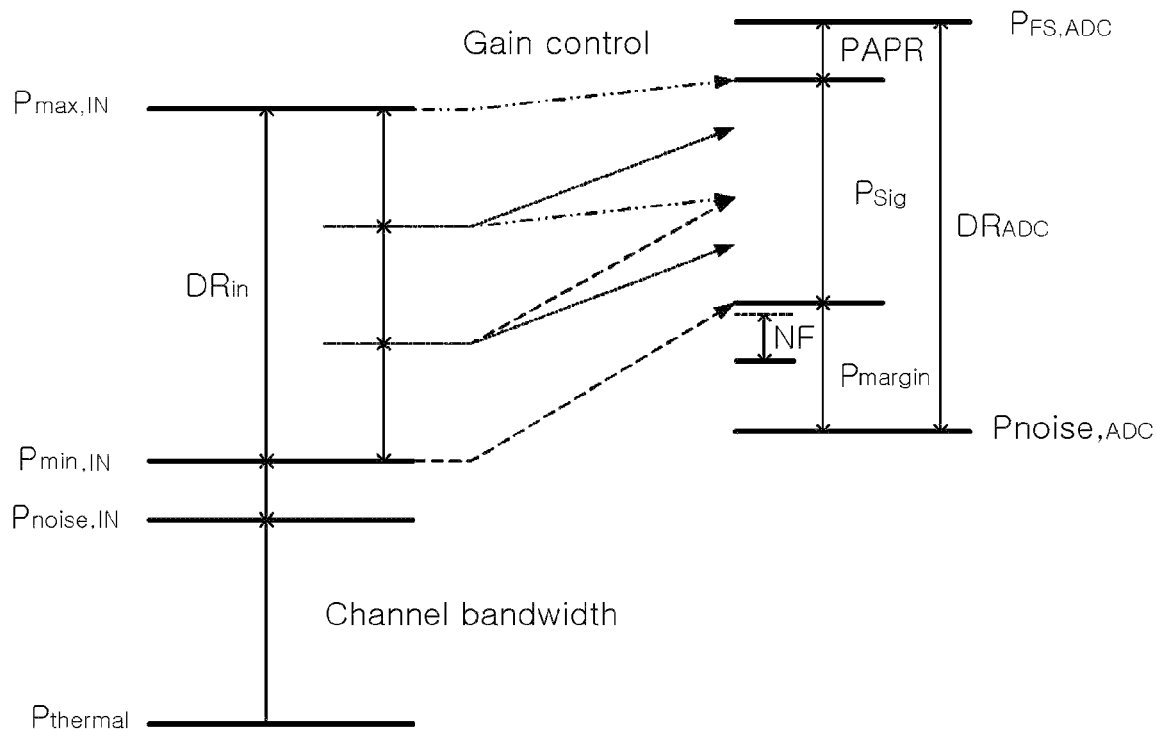
FIG. 7 illustrates a signal magnitude mapping method for processing an input signal and an adjacent interference signal by the digital receiver according to an embodiment of the present invention.

FIG. 7 illustrates a signal magnitude mapping method for processing an input signal and an adjacent interference signal by the digital receiver according to an embodiment of the present invention.

In consideration of a signal-to-noise ratio that can be finally obtained from a desired channel bandwidth (BW) in consideration of noise generated in the receiver, $DR_{IN}$ refers to a range between a maximum value and a minimum value of input signal power. In one embodiment, the ADC can be technically designed by using the gain control of the variable amplifier, and for an effective designing, $DR_{IN}$ is mapped to within an input signal available range of the ADC. In this case, the $DR_{IN}$ is divided into certain number of sections and gain-controlled so as to be mapped to the ADC. Also, design margins, such as Pmargin in consideration of quantization noise and PAPR in consideration of a ratio between a maximum magnitude and an average magnitude of a signal, are provided to properly receive the signal, and the desired signal is mapped to Psig. Accordingly, the overall input signal range of the ADC corresponds to DRADC which comes between $P_{FS,ADC}$ and $P_{NOISE,ADC}$. If the input signal range of the ADC was sufficiently wide, gain controlling would not be necessary, which is possible theoretically, apart from the likelihood of implementation. However, it is burdensome with the current technology, and for the effective designing of the ADC, gain from an amplifier is required.

Figure 8:
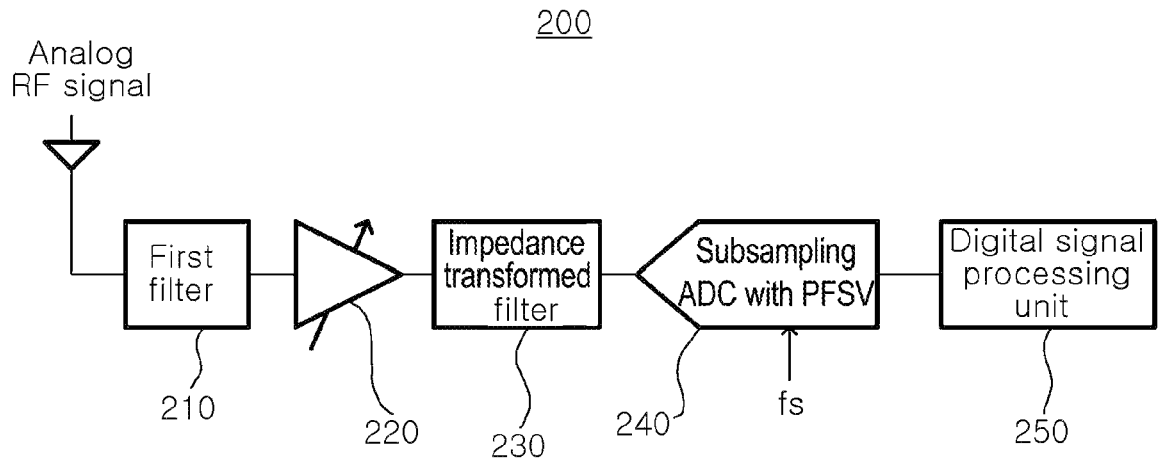
FIG. 8 is a block diagram of a digital receiver according to an embodiment of the present invention.

FIG. 8 is a block diagram of a digital receiver according to an embodiment of the present invention.

As shown in FIG. 8, a digital receiver 200 according to an embodiment of the present invention includes a first filter 210, a variable amplifier 220, a second filter 230, a sub sampling ADC 240, and a digital signal processing unit 250. The first filter 210, the variable amplifier 220 and the second filter 230 may correspond to the noise attenuation and signal magnitude mapping variable amplifying unit of FIG. 5.

The first filter 210 band-pass filters a received analog RF signal to reduce the power of noise such as an interference signal, white noise, or the like, included in the analog RF signal.

The variable amplifier 220 variably amplifies the signal which has passed through the first filter 210. The variable amplifier 220 has a noise canceling function in addition of a signal amplifying function.

In detail, the variable amplifier 220 has variable gain characteristics to adjust the magnitude of a signal input to the sub sampling ADC 240 according to the magnitude of the signal output from the first filter 210, and has a certain amplification degree to allow the subsampling ADC 240 to have a desired signal-to-noise ratio when outputting a digital signal.

The second filter 230 band-pass filters the signal output from the variable amplifier 220 to further reduce the power of noise such as an interference signal, white noise, and the like, included in the analog RF signal. Here, the second filter 230 may be included by circuitry in the variable amplifier 220 so as to be implemented.

The digital receiver, according to the embodiment of the present embodiment, may not necessarily include all of the first filter 210, the variable amplifier 220, and the second filter 230, but may include one or more of them. That is, the reason is because, the front stage of the subsampling ADC 240 would be enough to sufficiently cancel the interference signals that may overlap through subsampling, then, any interference signals, near or adjacent to the desired signal, remaining in the analog RF signal, which have not been completely canceled at the front stage of the subsampling ADC 240, will be converted by the subsampling ADC 240 into digital signals and, further, the digital signal processing unit 250 will also cancel any noise signals included in the digital signal through digital filtering. Thus, the front stage of the subsampling ADC 240 may have a configuration including the first filter 210, the variable amplifier 220, and the second filter 230, a configuration including the first filter 210 and the variable amplifier 220, and a configuration including the variable 220 and the second filter 230. If the dynamic range of the sub sampling ADC 240 is so wide, the front stage of the sub sampling ADC 240 may be implemented with only a filter. However, in terms of the current technology level and its application to the field of wireless communications applications, the configuration including all of the first filter 210, the variable amplifier 220, and the second filter 230 may be effective.

Also, the noise attenuation and signal magnitude mapping variable amplifying unit may have impedance transforming function and the like in order to change the magnitude of a signal voltage input to the sub sampling ADC 240. In particular, the second filter may be configured as an impedance transformed filter. The impedance transforming function means a technology for transmitting a signal power with converting input and output impedances, and may be configured by a transformer. When the output impedance is increased by the impedance transforming function, a magnitude of an output signal voltage is increased, and a magnitude of an output signal current is decreased. Then, a voltage magnitude of an output signal which is amplified in the variable amplifier 220, i.e., a low noise amplifier can be increased by the impedance transforming function of the noise attenuation and signal magnitude mapping variable amplifying unit. As a result, the voltage magnitude of the output signal of the noise attenuation and signal magnitude mapping variable amplifying unit can be fit to the input voltage range of the subsampling ADC 240 without excessively increasing an amplifying ratio of the variable amplifier 220. As such, when only an amplifier of the RF band, i.e., the variable amplifier 220 is used in the previous stage of the ADC, it is difficult to amplify the signal to the input signal range of the ADC 240 having a minimum input signal magnitude which is relatively great. However, the impedance transforming function of the embodiment of the present invention can solve this difficulty.

In addition, the digital receiver according to the embodiment of the present invention may adjust the dynamic range of the ADC 240 in accordance with the magnitude of an input signal of the previous stage of the ADC 240. The dynamic range of the ADC 240 can be adjusted by varying a full scale voltage of the ADC 240. That is, the ADC 240 may be configured as a subsampling ADC with programmable full scale voltage (PFSV). When the magnitude of the input signal is small, a signal to noise ratio (SNR) of the input signal is improved by decreasing the full scale voltage such that a sensitivity power level can be decreased. When the magnitude of the input signal is great, the linearity of the input signal can be improved by increasing the full scale voltage. As such, adjusting the full scale voltage can allow a desired SNR to be obtained from the output of the ADC 240 and a constant bit width to be maintained when the magnitude of the input signal is varied. In addition, when the ADC has a wide signal input range, the output bit width of the ADC is also increased such that the hardware of the digital signal processing unit is increased. However, the bit width which is processed in the digital signal processing unit is decreased by adjusting the full scale voltage such that the hardware can be simple. As a result, both the wide input signal range and the simple digital signal processing unit can be achieved in the embodiment of the present invention.

Furthermore, since an input unit of the subsampling ADC 240 is supposed to receive a signal of a frequency higher than the sampling frequency of the subsampling ADC 240, a signal input available bandwidth is taken into consideration. The variable amplifier itself may be designed to additionally perform the function of attenuating the magnitude of a different signal undesired by circuitry so as to serve as filters. The functions performed by such a variable amplifier may include feedforward, feedback interferer canceling, and the like, as general schemes.

The subsampling ADC 240 converts the input analog RF signal into an IF or DC digital signal by using the subsampling clock (fs) according to a subsampling scheme, and also performs oversampling on a desired signal band having a certain bandwidth (BW). Here, the subsampling frequency fs may be smaller than a carrier frequency (fRF) of the analog RF signal for subsampling and larger than a rational number multiple of the bandwidth (BW*M, M is rational number) of the desired signal for oversampling. Also, it is a significant structural design concern that the filter function of the noise attenuation and signal magnitude mapping variable amplifying unit be able to sufficiently attenuate aliasing noise and interference signals generated during subsampling to obtain a signal-to-noise ratio required for a subsampling ADC output. Namely, an embodiment of the present invention is intended to address the problems of subsampling which have not yet been overcome by the current level of technology in the wireless communications applications field, by using the technique of increasing the subsampling frequency in the case where aliasing noise caused by subsampling comes in the desired signal band to degrade a signal-to-noise ratio due to the shortage of band filtering function at the front stage of the ADC.

The digital signal processing unit 250 converts or filters a signal frequency of the digital signal which has been converted by the subsampling ADC 240 to cancel noise signals adjacent to the desired signal, and controls the gain according to the magnitude of the input signal to restore only desired signals. Unlike the analog area, a filter can be sharply designed in the digital area, so the digital signal processing unit 250 is advantageous for restoring only desired signals.

As a result, the digital receiver according to an embodiment of the present invention can be implemented with a simpler configuration, excluding analog elements such as a mixer, filter, VGA, and the like, and can effectively cancel noise in the digital area.

Figure 9:
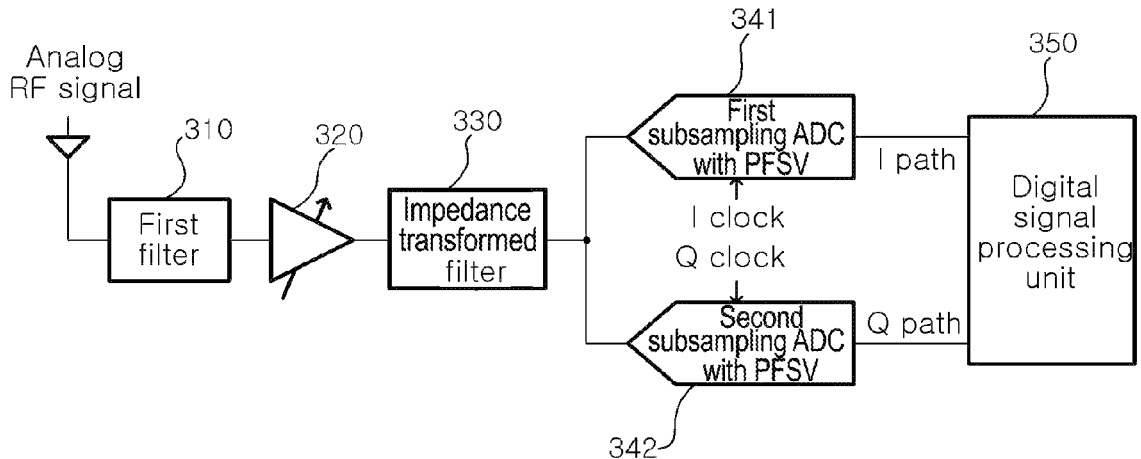
FIG. 9 is a block diagram of a digital receiver according to another embodiment of the present invention.

FIG. 9 is a block diagram of a digital receiver according to another embodiment of the present invention.

As shown in FIG. 9, a digital receiver 300 according to another embodiment of the present invention includes a first filter 310, a variable amplifier 320, a second filter 330, first and second subsampling ADCs 341 and 342, and a digital signal processing unit 350. In particular, the second filter 330 may be configured as an impedance transformed filter, and the first and second subsampling ADCs 341 and 342 may be configured as the subsampling ADCs with programmable full scale voltage (PFSV).

The digital receiver 300 illustrated in FIG. 9 is the same as the digital receiver 200 illustrated in FIG. 8, except for the two subsampling ADCs 341 and 342, so a detailed description of the first filter 310, the variable amplifier 320, the second filter 330, and the digital signal processing unit 350 will be omitted.

The first and second subsampling ADCs 341 and 342 form an I path and a Q path, respectively. The first subsampling ADC 341 on the I path and the second subsampling ADC 342 on the Q path are implemented to convert an input analog RF signal into I and Q signals which are orthogonal to each other by using I and Q clock signals which are orthogonal to each other.

According to a conventional I/Q separating method, since an I signal and a Q signal which have been separated by an I/Q mixer are input to an I path ADC and Q path ADC, the path ADC and Q path ADC samples the separated I signal and Q signal with a clock having the same phase. However, according to the embodiment of the present invention, the ADCs 341 and 342 do not sample the separated I signal and Q signal but sample an input signal with the I and Q clocks which have 90° phase difference. Accordingly, outputs of the ADCs 341 and 342 are digital signals which have the 90° phase difference. Then, the digital signal processing unit 350 compensates the phase difference by a digital signal process, and the digital signal processing is a simple and exact process. In addition, in the case that the I path and Q path ADCs samples discrete signals which have been separated into I and Q signal in the conventional I/Q separating method, the phase of the Q signal is delayed if the I path and Q path ADCs use the clock which are adjusted to the I signal. As a result, a data eye is reduced. However, this problem does not occur in the embodiment of the present invention.

Figure 10:
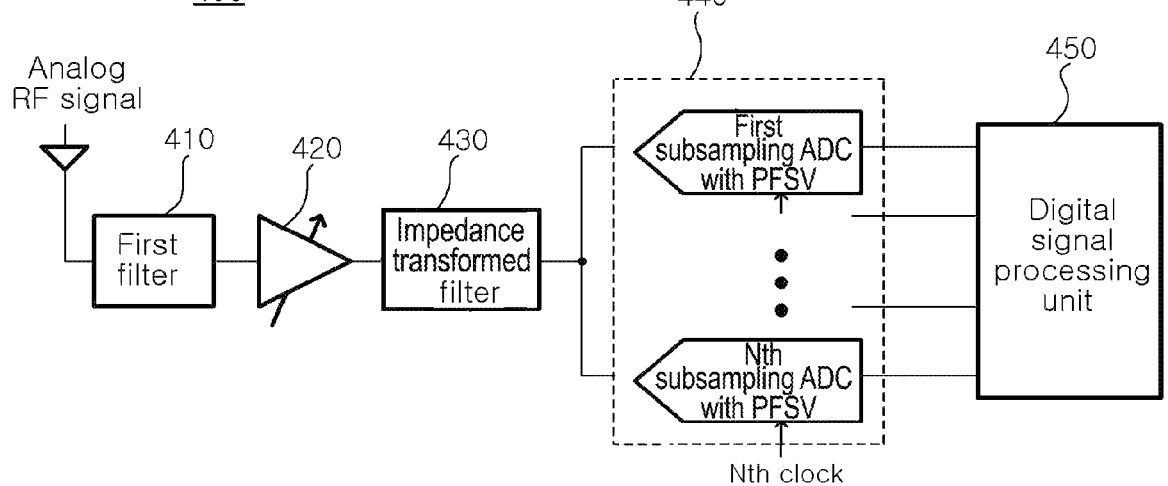
FIG. 10 is a block diagram of a digital receiver according to still another embodiment of the present invention.

FIG. 10 is a block diagram of a digital receiver according to still another embodiment of the present invention.

As shown in FIG. 10, a digital receiver 400 according to still another embodiment of the present invention includes a first filter 410, a variable amplifier 420, a second filter 430, a plurality of subsampling ADCs 440, and a digital signal processing unit 450. In particular, the second filter 430 may be configured as the impedance transformed filter, and the subsampling ADCs 440 may be configured as the subsampling ADCs with programmable full scale voltage (PFSV).

The digital receiver 400 illustrated in FIG. 10 is the same as the digital receiver 200 illustrated in FIG. 8, except for the plurality of subsampling ADCs 440 connected in parallel, so a detailed description of the first filter 410, the variable amplifier 420, the second filter 430, and the digital signal processing unit 450 will be omitted.

In this case, a signal which has passed through the second filter 430 is divided into a plurality of sub-channels, each of the plurality of sub-channels is input to the plurality of subsampling ADCs so as to be converted into digital signals. The digital signal processing unit 450 additionally performs the function of combining the plurality of digital signals.

Figure 11:
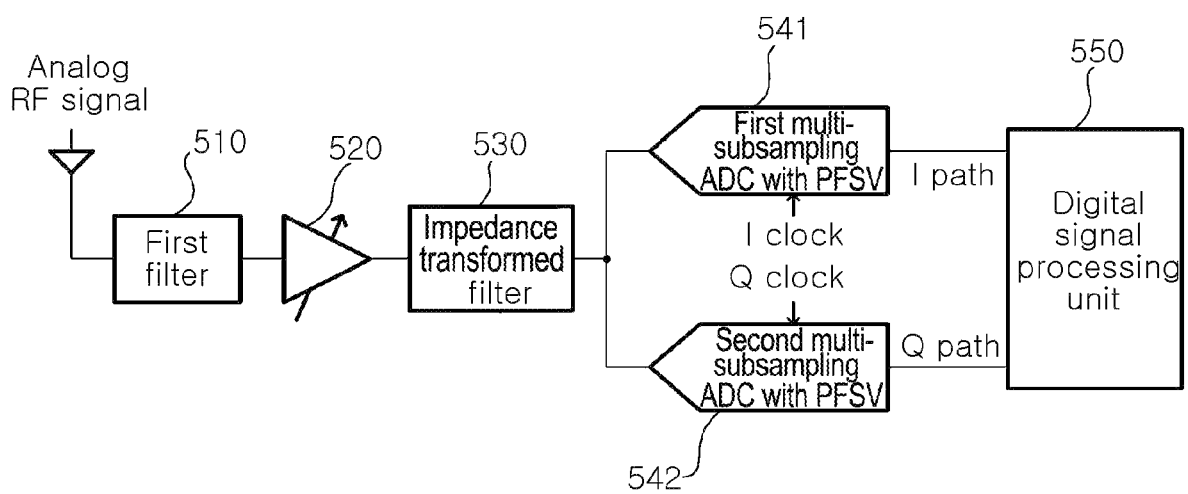
FIG. 11 is a block diagram of a digital receiver according to yet another embodiment of the present invention.

FIG. 11 is a block diagram of a digital receiver according to yet another embodiment of the present invention. Specifically, FIG. 11 shows that the first and second multi-subsampling ADCs 341 and 342 illustrated in FIG. 9 are implemented as a plurality of subsampling ADCs connected in parallel, respectively, like those as illustrated in FIG. 10. In particular, the second filter 530 may be configured as an impedance transformed filter, and the multi-subsampling ADCs 541 and 542 may be configured as the subsampling ADCs with programmable full scale voltage (PFSV).

In this case, the first and second multi-subsampling ADCs 541 and 542 form I and Q paths, respectively, and the first multi-subsampling ADC 541 on the I path and the second multi-subsampling ADC 542 on the Q path are implemented to convert an input analog RF signal into I and Q signals which are orthogonal to each other by using I and Q clock signals which are orthogonal to each other.

Also, like the digital receiver 400 illustrated in FIG. 10, in the digital receiver 500, a signal which has passed through the second filter 530 and then input to the I and Q paths, is divided into a plurality of sub-channels, each of the plurality of sub-channels is input to the plurality of subsampling ADCs so as to be converted into digital signals. The digital signal processing unit 550 additionally performs the function of combining the plurality of digital signals.

Meanwhile, unlike the existing Nyquist ADC, the subsampling ADCs 240, 341, 342, 440, 541, 542 illustrated in FIGS. 8 to 11 include a high speed input unit (not shown) to receive an input RF signal carried in a carrier frequency for subsampling at a high speed in order to minimize the attenuation of the input RF signal. Here, the high speed input unit may be implemented in various forms. For example, it may undergo a bootstrapping process such as a sampler or the like, and to this end, the high speed input unit may perform impedance matching.

As set forth above, in the digital receiver according to embodiments of the invention, a received analog RF signal is converted into an IF signal or a DC signal according to a subsampling scheme and oversampling is performed on a desired signal band, whereby even noise signals adjacent to a desired signal are converted into digital signals, thus the noise signals adjacent to the desired signal are processed digitally.

Because those which have been conventionally designed in the analog area are designed in the digital area at its maximum level, the corresponding configuration can be easily applied for a multi-standard and can be digitally designed each time the process is upgraded, and time-to-market can be dramatically shortened.

While the present invention has been shown and described in connection with the embodiments, it will be apparent to those skilled in the art that modifications and variations can be made without departing from the spirit and scope of the invention as defined by the appended claims.

What is claimed is:

1. A digital receiver comprising:
a noise attenuation and signal magnitude mapping variable amplifying unit including a filter and a variable amplifier, the noise attenuation and signal magnitude mapping variable amplifying unit for dividing a power of an analog signal into a plurality of sections, controlling a gain by the section to adjust a magnitude of the analog signal, and attenuating white noise and an interference signal in the analog signal;
an analog-to-digital converter (ADC) for performing subsampling on a carrier frequency of a desired signal and performing oversampling on a band of the desired signal by using a sampling frequency to convert the analog signal which has passed through the noise attenuation and signal magnitude mapping variable amplifying unit into a digital signal of a direct conversion (DC) frequency band or an intermediate frequency band, the ADC having a dynamic range for processing the desired signal and for processing an undesired signal adjacent to the desired signal by using the oversampling when converting the analog signal into the digital signal; and
a digital signal processing unit for converting a signal frequency of the digital signal or digital-filtering the undesired signal in the digital signal, and processing the digital signal by digitally adjusting a gain,
wherein the noise attenuation and signal magnitude mapping variable amplifying unit has impedance transforming function for converting a magnitude of a signal voltage of a signal power transmitted to the ADC.

2. The digital receiver of claim 1, wherein an input signal range of the ADC is adjusted by varying a full scale voltage the ADC.

3. The digital receiver of claim 1, wherein the subsampling frequency is smaller than the carrier frequency, and is set to allow the filter to attenuate aliasing noise and interference signal generated when the subsampling is performed to thus obtain a signal-to-noise ratio required for an output of the ADC.

4. The digital receiver of claim 1, wherein the filter comprises:
a first filter for band-passing the analog signal to attenuate white noise and an interference signal, and transmitting the attenuated white noise and interference signal to the variable amplifier; and a second filter for band-passing a signal output from the variable amplifier to attenuate white noise and an interference signal, wherein the variable amplifier amplifies a signal output from the first filter by controlling the gain by the section.

5. The digital receiver of claim 1, wherein the filter band-passes the analog signal to attenuate white noise and an interference signal, and transmits the attenuated white noise and an interference signal to the variable amplifier, and the variable amplifier amplifies a signal output from the filter by controlling the gain by the section.

6. The digital receiver of claim 1, wherein the variable amplifier amplifies the analog signal by controlling the gain by the section, and the filter band-passes a signal output from the variable amplifier to attenuate white noise and an interference signal.

7. The digital receiver of claim 1, wherein the variable amplifier converts a signal range of the analog signal into an input signal range of the ADC by controlling the gain by the section.

8. The digital receiver of claim 1, wherein the ADC comprises a plurality of parallel ADCs, the analog signal which has passed through the noise attenuation and signal magnitude is divided into a plurality of sub-channels, each parallel ADC converts a corresponding sub-channel among the plurality of sub-channels into a digital signal, and the digital signal processing unit combines a plurality of digital signals which are respectively output from the plurality of parallel ADCs.

9. A digital receiver comprising:

a noise attenuation and signal magnitude mapping variable amplifying unit including a filter and a variable amplifier, the noise attenuation and signal magnitude mapping variable amplifying unit for dividing a power of an analog signal into a plurality of sections, controlling a gain by the section to adjust a magnitude of the analog signal, and attenuating white noise and an interference signal in the analog signal;

an analog-to-digital converter (ADC) for performing subsampling on a carrier frequency of a desired signal and performing oversampling on a band of the desired signal by using a sampling frequency to convert the analog signal which has passed through the noise attenuation and signal magnitude mapping variable amplifying unit into a digital signal of a direct conversion (DC) frequency band or an intermediate frequency band, the ADC having a dynamic range for processing the desired signal and for processing an undesired signal adjacent to the desired signal by using the oversampling when converting the analog signal into the digital signal; and a digital signal processing unit for converting a signal frequency of the digital signal or digital-filtering the undesired signal in the digital signal, and processing the digital signal by digitally adjusting a gain, wherein the ADC comprises an I-path subsampling ADC and a Q-path sub sampling ADC, the I-path subsampling ADC converts the analog signal into an I signal by using the sampling frequency according to a first clock signal, and the Q-path subsampling ADC converts the analog signal into a Q signal by using the sampling frequency according to a second clock signal, the first clock signal and the second clock signal being mutually orthogonal.

10. The digital receiver of claim 9, wherein an input signal range of the ADC is adjusted by varying a full scale voltage the ADC.

11. The digital receiver of claim 9, wherein the noise attenuation and signal magnitude mapping variable amplifying unit has impedance transforming function for converting a signal voltage magnitude of a signal power transmitted to the ADC.

12. The digital receiver of claim 9, wherein the subsampling frequency is smaller than the carrier frequency, and is set to allow the filter to attenuate aliasing noise and interference signal generated when the subsampling is performed to thus obtain a signal-to-noise ratio required for an output of the ADC.

13. The digital receiver of claim 9, wherein the I-path subsampling ADC comprises a plurality of parallel I-path ADCs, the Q-path subsampling ADC comprises a plurality of parallel Q-path ADCs, the analog signal which has passed through the noise attenuation and signal magnitude is divided into a plurality of sub-channels, each parallel I-path ADC converts a corresponding sub-channel among the plurality of sub-channels into an I signal, each parallel Q-path ADC converts a corresponding sub-channel among the plurality of sub-channels into a Q signal, and the digital signal processing unit combines a plurality of I signals which are respectively output from the plurality of parallel I-path ADCs and a plurality of Q signals which are respectively output from the plurality of parallel Q-path ADCs.

* * * * *